(12) United States Patent
Satoh

(10) Patent No.: US 12,742,487 B2
(45) Date of Patent: Sep. 22, 2026

(54) VIBRATION ISOLATION STRUCTURE

(71) Applicant: NITTO KOHKI CO., LTD., Tokyo (JP)

(72) Inventor: Masahiro Satoh, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 537 days.

(21) Appl. No.: 18/477,007

(22) Filed: Sep. 28, 2023

(65) Prior Publication Data

US 2024/0110611 A1 Apr. 4, 2024

(30) Foreign Application Priority Data

Sep. 29, 2022 (JP) ................................ 2022-155824

(51) Int. Cl.
*F16F 15/04* (2006.01)

(52) U.S. Cl.
CPC .................................. *F16F 15/04* (2013.01)

(58) Field of Classification Search
CPC .......... F16F 1/371; F16F 1/3735; F16F 15/08; F04C 2230/604; F04B 39/0044
See application file for complete search history.

(56) References Cited

U.S. PATENT DOCUMENTS 4,806,437 A * 2/1989 Yokoi .................. F16F 1/3605 428/653
5,040,953 A * 8/1991 Tinsler ................. F25D 23/006 248/634
5,213,484 A * 5/1993 Hashimoto ............ F04B 43/04 417/312
6,382,935 B1 * 5/2002 Mikiya ................. H02K 33/16 417/413.1
11,747,078 B1 * 9/2023 Schulze ................. B23P 19/04 29/525.11
2020/0318771 A1 * 10/2020 Houguchi ............ F04B 39/123
2025/0075696 A1 * 3/2025 Han ...................... F04B 53/003
2025/0237211 A1 * 7/2025 Miura .................... F04B 43/02

FOREIGN PATENT DOCUMENTS

JP 2002266931 9/2002
JP 2004044601 2/2004

* cited by examiner

*Primary Examiner* — Nicholas J Lane
(74) *Attorney, Agent, or Firm* — Burris Law, PLLC

(57) ABSTRACT

A vibration isolation structure includes a mounting structure part secured to a pump, an elastic vibration isolation member attached to the mounting structure part, and an upper securing member secured to the mounting structure part to hold the elastic vibration isolation member. The upper securing member has first and second body portions opposed to each other across a tabular mounting portion of the mounting structure part in a thickness direction thereof. A connecting portion connects together the first and second body portions, and a locking projection extends from the first body portion. The upper securing member is secured to the mounting structure part by engagement of the locking projection with a locking surface of the mounting structure part. The upper securing member holds the elastic vibration isolation member to the tabular mounting portion by engaging the elastic vibration isolation member at a side closer to a side surface.

8 Claims, 11 Drawing Sheets

VIBRATION ISOLATION STRUCTURE

CROSS-REFERENCE TO RELATED APPLICATION

This application claims priority to and the benefit of JP 2022-155824 filed on Sep. 29, 2022. The disclosure of the above application is incorporated herein by reference.

FIELD

The present disclosure relates to a vibration isolation structure for devices.

BACKGROUND

Vibration isolation structures are used when installing devices which are accompanied by vibration when driven, such as a pump, a compressor, etc. or when fitting these devices with another device or equipment to reduce vibration transmitted to the place of installation and other devices. There are various types of vibration isolation structure. Among them, particularly, a vibration isolation structure utilizing an elastic member, e.g., rubber, may be employed from the viewpoint that the structure can be constructed at low cost. Japanese Patent Application Publication No. 2004-44601, for example, discloses a structure in which a diaphragm pump is secured to a bracket through four elastic vibration isolation members (legs) made of an elastic material, e.g., rubber, and the bracket is attached to a desired position. The elastic vibration isolation members are installed by inserting narrow portions thereof into insertion holes, respectively, formed in tabular mounting portions provided on a housing of the pump. In addition, the elastic vibration isolation members are attached to the bracket in the same way as the above.

The pump having the above-described vibration isolation structure is assumed to be installed with the vibration isolation structure facing downward. However, the pump may be used with the vibration isolation structure disposed horizontally, for example, and in that case there is a possibility that the rubber elastic vibration isolation members may be undesirably detached from the mounting portions when subjected to a horizontal force. Also, when a great force is externally applied to the pump, for example, the elastic vibration isolation members may be undesirably detached from the mounting portions in response to application of a horizontal force thereto. Under these circumstances, the conventional practice is to secure the elastic vibration isolation members to the mounting portions by using adhesive, for example, with a view to even more reliably inhibit undesired detachment of the elastic vibration isolation members from the mounting portions. Using adhesive to secure the elastic vibration isolation members, however, increases the time required to complete assembly because it takes a long time for the adhesive to dry. In addition, overflow of adhesive may degrade the appearance.

SUMMARY

Accordingly, the present disclosure provides a vibration isolation structure configured to reliably inhibit elastic vibration isolation members from being accidentally detached without using adhesive.

The present disclosure provides a vibration isolation structure for a device accompanied by vibration. The vibration isolation structure may include at least one mounting structure part secured to the device and having a tabular mounting portion and a locking surface facing the tabular mounting portion. The tabular mounting portion has an insertion hole extending therethrough in a thickness direction of the tabular mounting portion and extending in a longitudinal direction of the tabular mounting portion to a side surface of the tabular mounting portion. The vibration isolation structure further may include at least one elastic vibration isolation member having a narrow portion narrowed by a mounting groove formed therein. The elastic vibration isolation member is attached to the tabular mounting portion in such a manner that the narrow portion is inserted into the insertion hole in the longitudinal direction so that the tabular mounting portion is partially located in the mounting groove. Further, the vibration isolation structure may include at least one securing member secured to the mounting structure part to hold the elastic vibration isolation member to the tabular mounting portion. The securing member has a first body portion and a second body portion opposed to each other across the tabular mounting portion in the thickness direction. A connecting portion connects one end of the first body portion and one end of the second body portion. A locking projection projects from the first body portion away from the tabular mounting portion. The securing member may be secured to the mounting structure part by engagement of the locking projection with the locking surface, and holds the elastic vibration isolation member to the tabular mounting portion by engaging the elastic vibration isolation member at least from a side thereof closer to the above-described side surface.

With the vibration isolation structure, the elastic vibration isolation member can be held to the mounting structure part by using the securing member. Accordingly, it is possible to even more reliably inhibit the elastic vibration isolation member from being detached from the mounting structure part without using adhesive.

In one form, the securing member may be configured such that the distance between the first body portion and the second body portion when the securing member is not attached to the mounting structure part is smaller than the thickness of the tabular mounting portion, so that as the tabular mounting portion is inserted between the first body portion and the second body portion, the securing member is deformed such that the other end of the first body portion and the other end of the second body portion come away from each other. In another form, the locking projection may be provided on the other end of the first body portion.

The above-described arrangement permits the locking projection to more firmly engage the locking surface when the securing member is attached to the mounting structure part, thereby allowing the securing member to be secured to the mounting structure part more firmly.

In another form, the securing member may be a metal plate member formed by bending a single tabular member. The first body portion and the second body portion each may have a receiving hole to receive the narrow portion of the elastic vibration isolation member. The first body portion and the second body portion may be partially located in the mounting groove. At least one of the first body portion and the second body portion may be engaged with the elastic vibration isolation member, thereby holding the elastic vibration isolation member to the tabular mounting portion.

The above-described arrangement permits the elastic vibration isolation member to be held more reliably.

In one form, the mounting structure part may include a plurality of the mounting structure parts. The elastic vibration isolation member may include a plurality of elastic vibration isolation members. The securing member may include a plurality of securing members. The plurality of elastic vibration isolation members and the plurality of securing members may be attached to the plurality of mounting structure parts, respectively. The elastic vibration isolation member each may be a columnar member extending from one end to the other end. The narrow portion may be provided at a side of the elastic vibration isolation member closer to the one end. The elastic vibration isolation member may further have a coupling narrow portion at a side thereof closer to the other end. The coupling narrow portion may have a coupling mounting groove formed therein. The vibration isolation structure may further include a coupling member coupling together the plurality of elastic vibration isolation members at the coupling narrow portions, and a plurality of coupling securing members secured to the coupling member to hold the elastic vibration isolation members to the coupling member.

In the above-described case, the coupling member may have a plurality of coupling tabular mounting portions, the coupling tabular mounting portions each having a coupling insertion hole extending therethrough in a thickness direction of the coupling insertion hole and extending in a width direction of the coupling insertion hole to a first side surface of the coupling insertion hole. The coupling securing members each may have a first coupling body portion and a second coupling body portion opposed to each other across the coupling tabular mounting portion in the thickness direction. A connecting portion connects together one end of the first coupling body portion and one end of the second coupling body portion, and a coupling locking projection projects from the other end of the first coupling body portion toward the second coupling body portion. The coupling securing member may be attached to the coupling tabular mounting portion from a side closer to the first side surface so that the coupling locking projection engages a second side surface of the coupling tabular mounting portion opposite the first side surface, thereby inhibiting the coupling securing member from being detached from the coupling tabular mounting portion. In one form, the coupling securing member may hold the elastic vibration isolation member to the coupling tabular mounting portion by engaging the elastic vibration isolation member at least from a side closer to the first side surface

DRAWINGS

In order that the disclosure may be well understood, there will now be described various forms thereof, given by way of example, reference being made to the accompanying drawings, in which.

DETAILED DESCRIPTION

Figure 1:
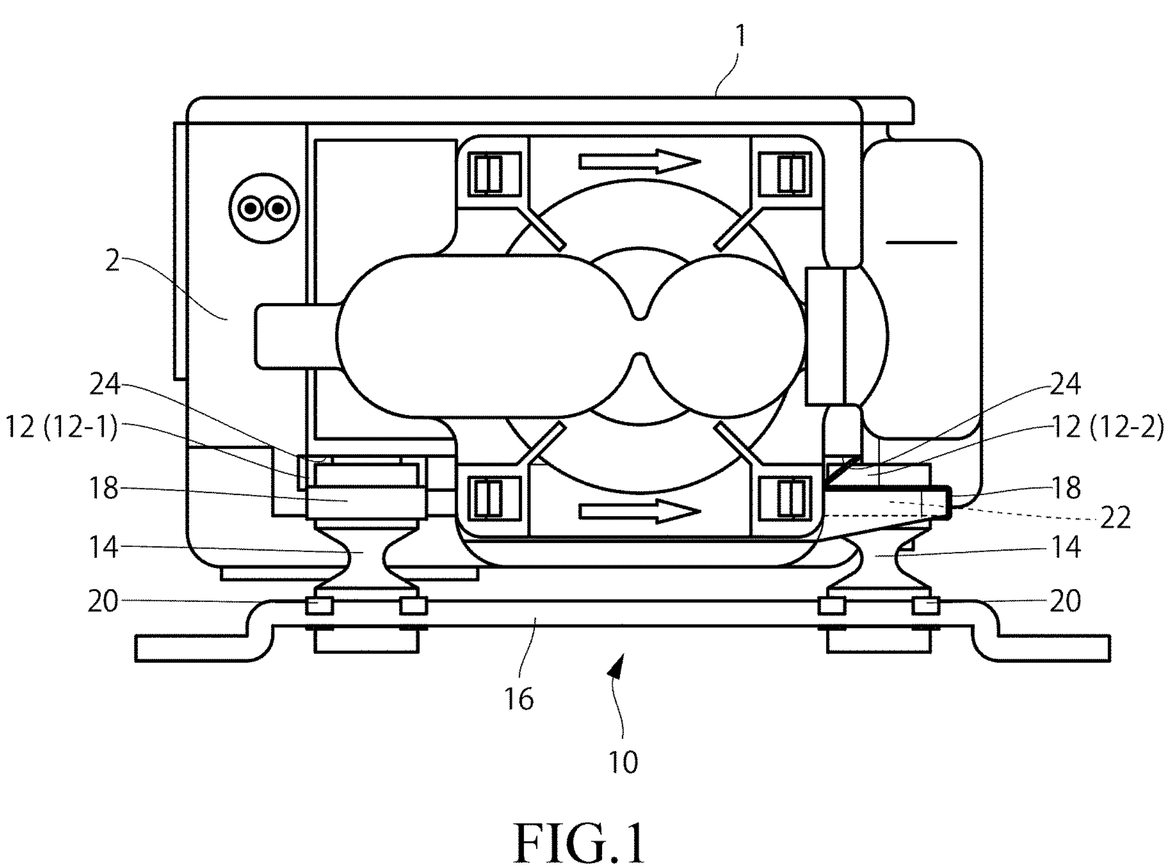
FIG. 1 is a side view of a pump device including a vibration isolation structure according to the principles of the present disclosure.
Figure 2:
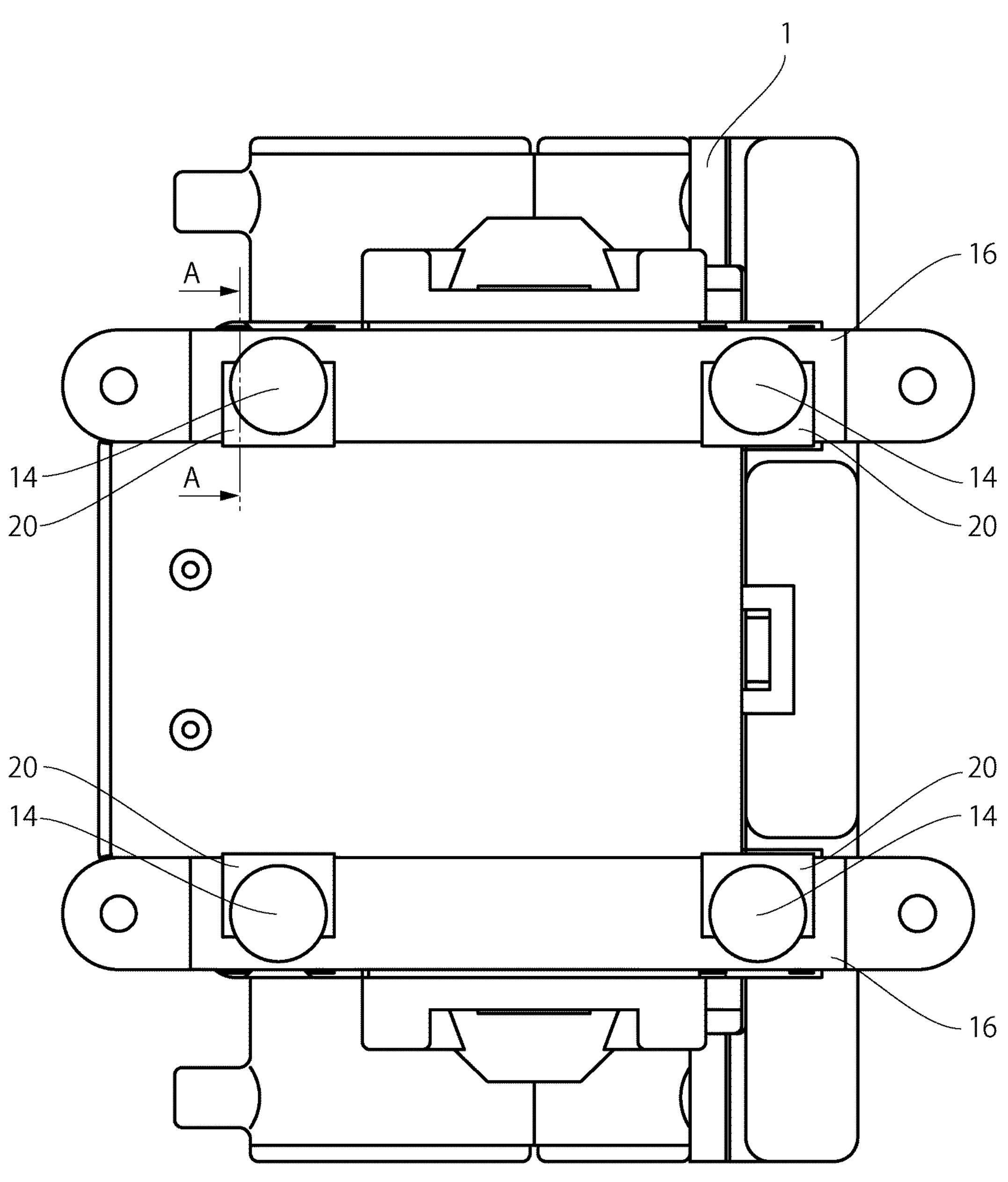
FIG. 2 is a bottom view of the pump device of FIG. 1.

As shown in FIGS. 1 and 2, a vibration isolation structure 10 according to one form of the present disclosure includes mounting structure parts 12 provided on a housing 2 of a pump 1, four elastic vibration isolation members 14 attached to the mounting structure parts 12, and two coupling members 16 each coupling together two elastic vibration isolation members 14 at the lower ends thereof. Each elastic vibration isolation member 14 is held to one of the mounting structure parts 12 by an upper securing member 18 and held to one of the coupling member 16 by a lower securing member or coupling securing member 20. By attaching the coupling members 16 to a predetermined place of installation, the pump 1 may be installed through the vibration isolation structure 10, and the vibration isolation structure 10 may absorb the vibration of the pump 1.

Figure 3:
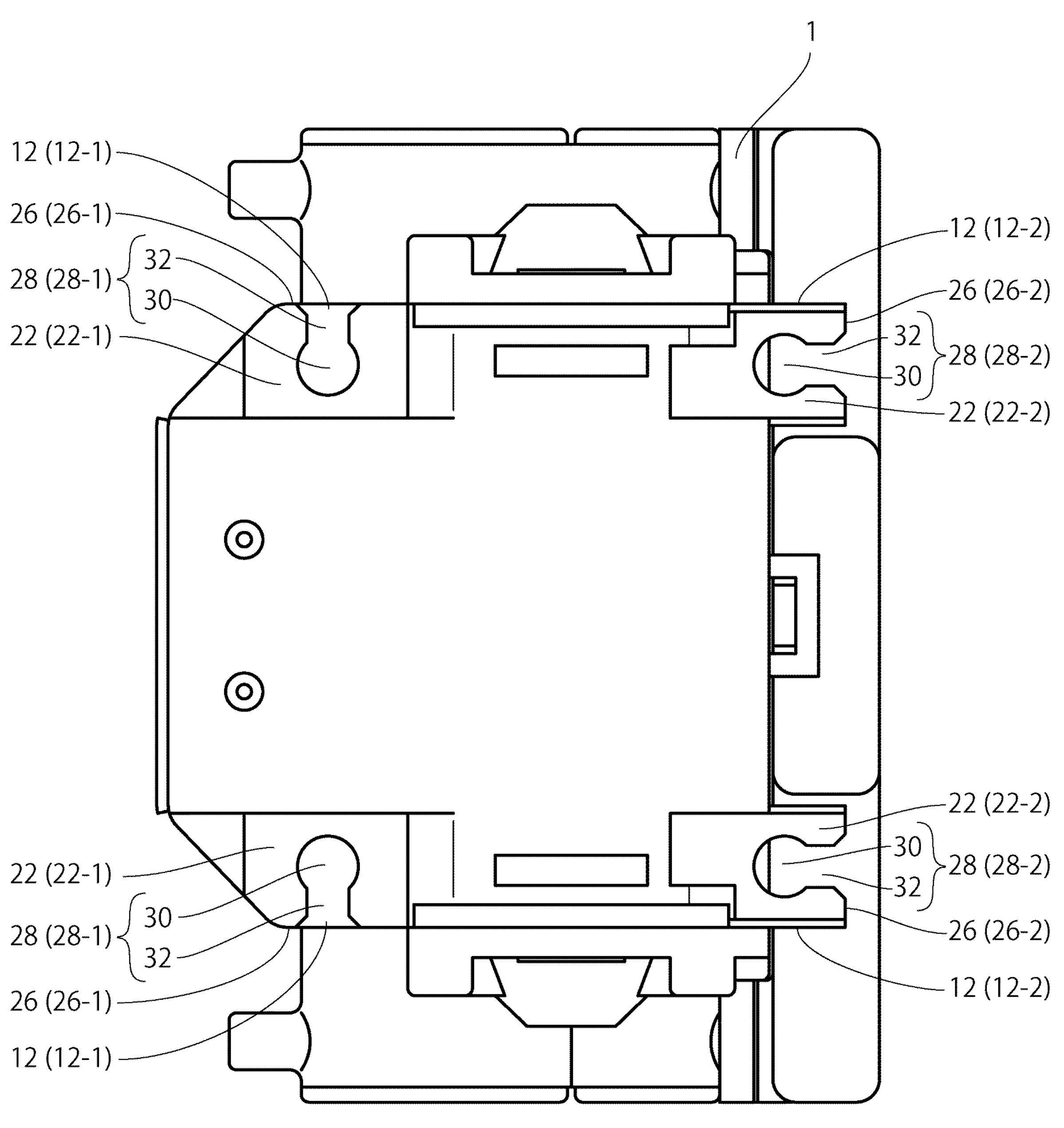
FIG. 3 is a bottom view of the pump device of FIG. 2 with elastic vibration isolation members and coupling members removed therefrom for clarity.

The mounting structure parts 12 are provided integrally with the housing 2 of the pump 1. Each mounting structure part 12 has a tabular mounting portion 22 extending horizontally as seen in FIG. 1, and a locking surface 24 facing the tabular mounting portion 22 from above. As shown in FIG. 3, there are provided four mounting structure parts 12. The tabular mounting portions 22-1 of the mounting structure parts 12-1, which are located at the left-hand side as seen in FIG. 3, have insertion holes 28-1, which extend through the tabular mounting portions 22-1 in the direction of thickness thereof (depth direction of FIG. 3) and which extend longitudinally (vertical direction in the figure) to respective side surfaces 26-1. The tabular mounting portions 22-2 of the mounting structure parts 12-2, which are located at the right-hand side as seen in FIG. 3, have insertion holes 28-2, which extend through the tabular mounting portions 22-2 in the direction of thickness thereof (depth direction of FIG. 3) and which extend laterally (horizontal direction in the figure) to respective side surfaces 26-2. Each insertion hole 28 includes an arcuate portion 30 located at a substantially central position of the tabular mounting portion 22, and a slightly narrow passage portion 32 extending from the arcuate portion 30 to the side surface 26.

Figure 4:
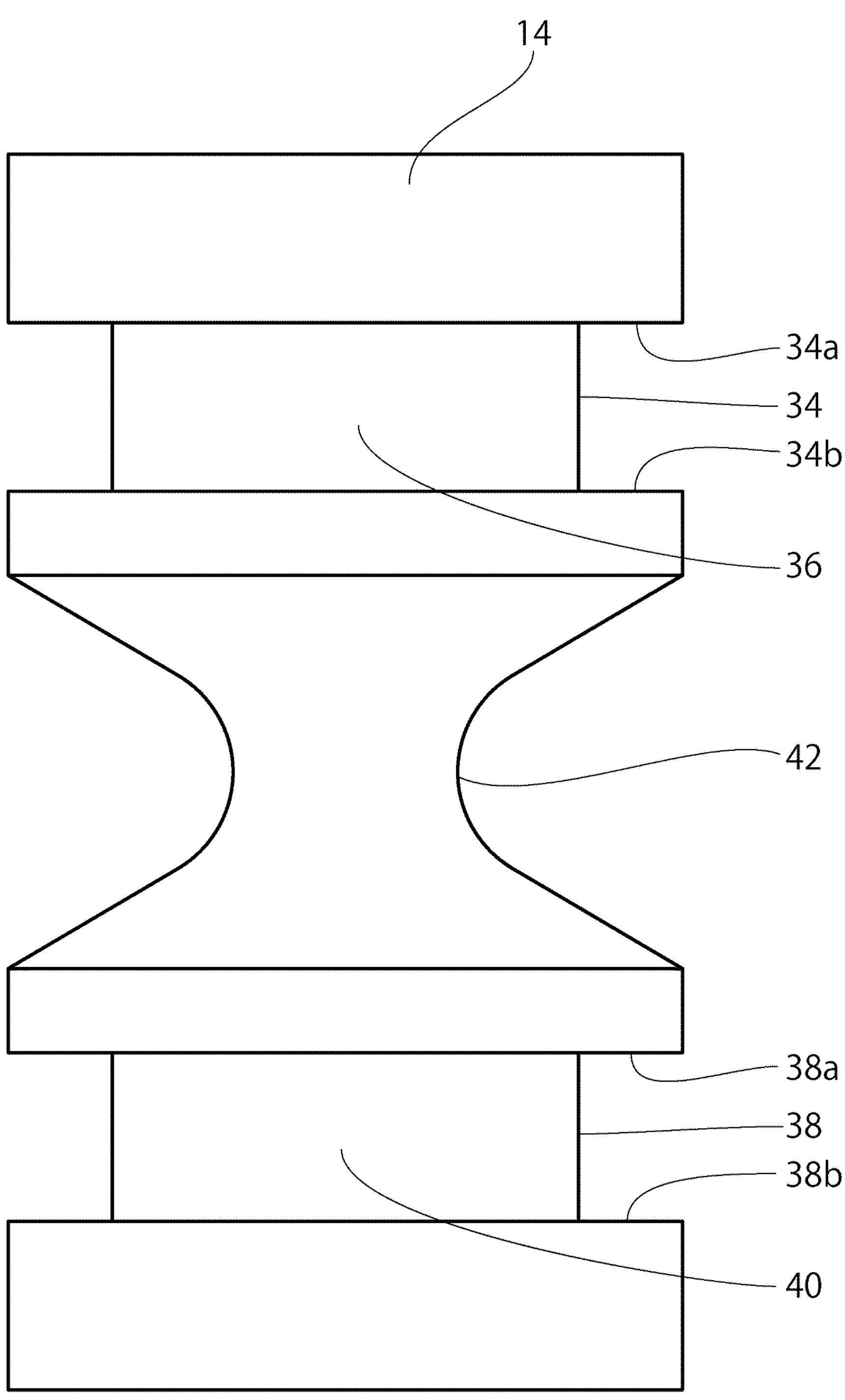
FIG. 4 is a side view of an elastic vibration isolation member of the vibration isolation structure of FIG. 1.

As shown in FIG. 4, the elastic vibration isolation member 14 is formed into a circular columnar shape as a whole. The elastic vibration isolation member 14 has an upper narrow portion 36 narrowed by an annular upper mounting groove 34 formed at an upper end (one end) thereof, and a lower narrow portion or coupling narrow portion 40 narrowed by an annular lower mounting groove or coupling mounting groove 38 formed at a lower end (the other end) thereof. In addition, the elastic vibration isolation member 14 has a constricted portion 42 in a vertical center thereof.

Figure 5:
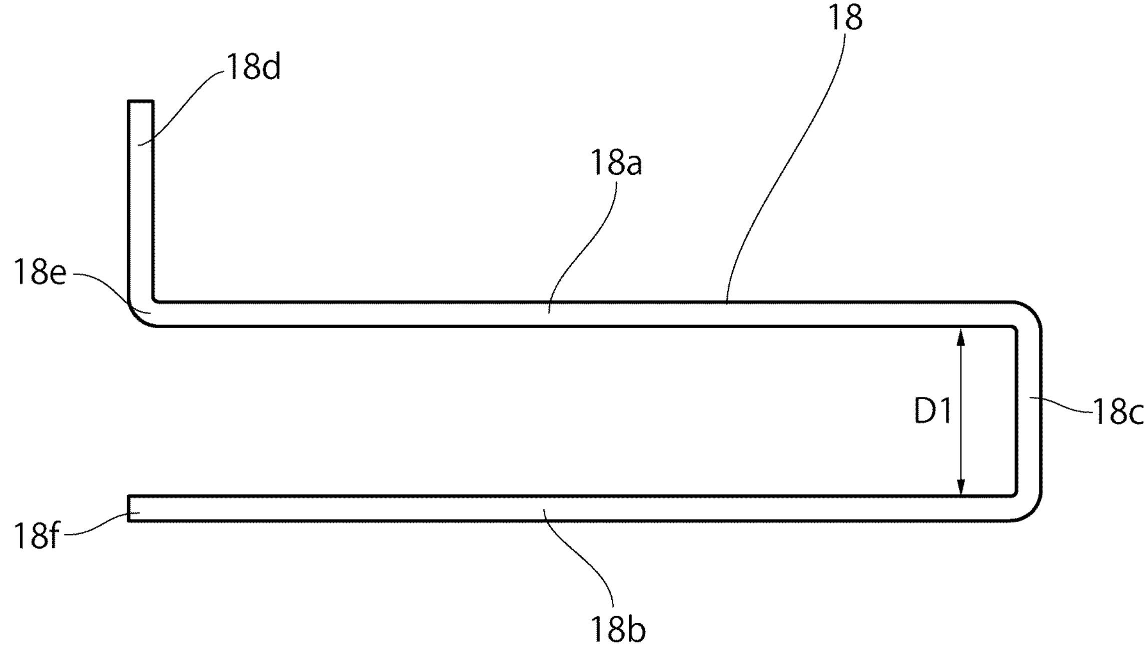
FIG. 5 is a side view of an upper securing member of the vibration isolation structure of FIG. 1 for holding an elastic vibration isolation member to a tabular mounting portion according to the principles of the present disclosure.
Figure 6:
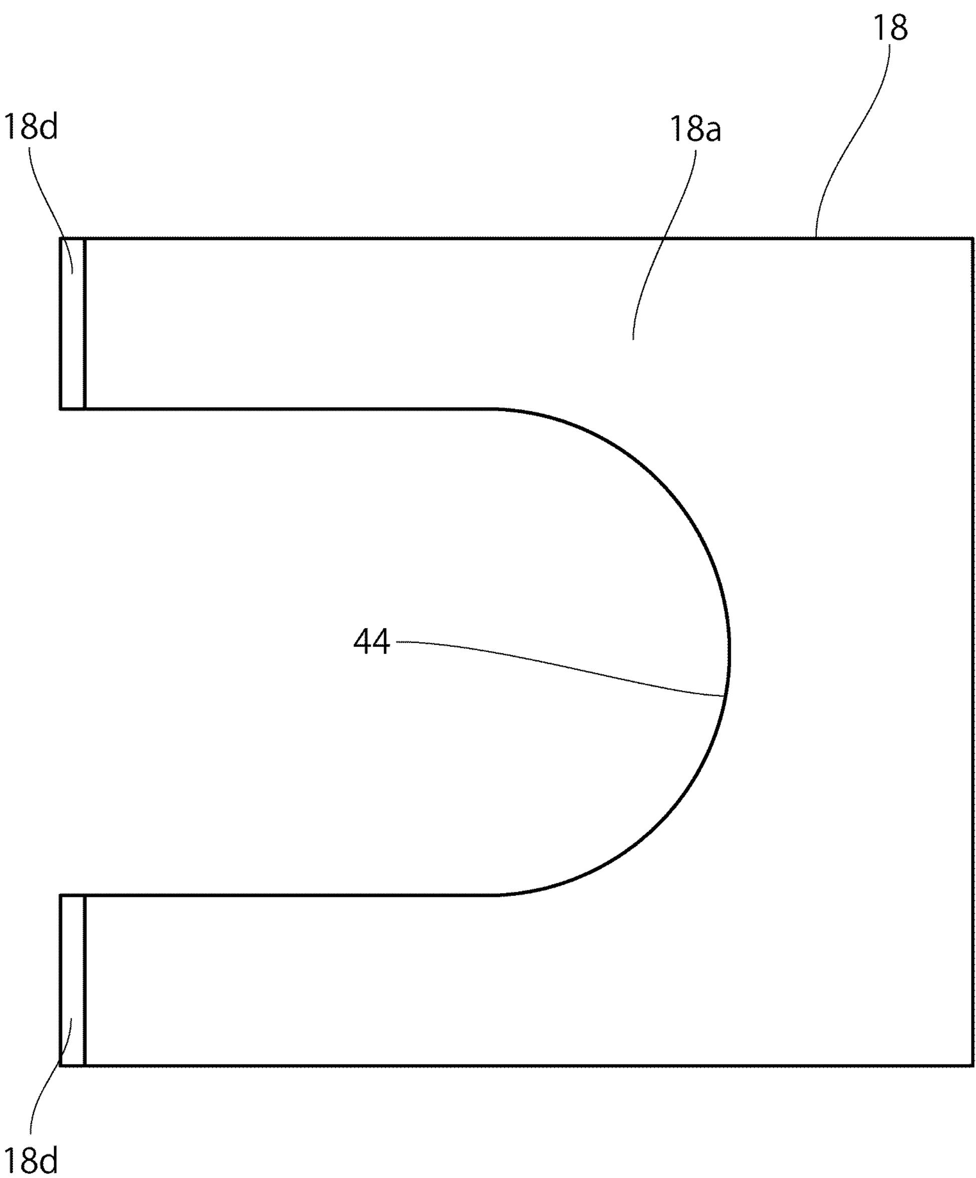
FIG. 6 is a top view of the upper securing member of FIG. 1.

With reference to FIGS. 5 and 6, the upper securing member 18 is a metal plate member formed by bending a single tabular member. The upper securing member 18 has first and second body portions 18_a_ and 18_b_ (FIG. 5) extending to face each other at a distance D1, a connecting portion 18_c_ (FIG. 5) connecting together one end of the first body portion 18_a_ and one end of the second body portion 18_b_, and a locking projection 18_d_ extending to project from the other end 18_e_ of the first body portion 18_a_ away from the second body portion 18_b_. The first body portion 18_a_ and the second body portion 18_b_ have receiving holes 44 (FIG. 6) formed therein. The receiving holes 44 are sized to receive the upper narrow portion 36 of the elastic vibration isolation member 14.

Figure 7:
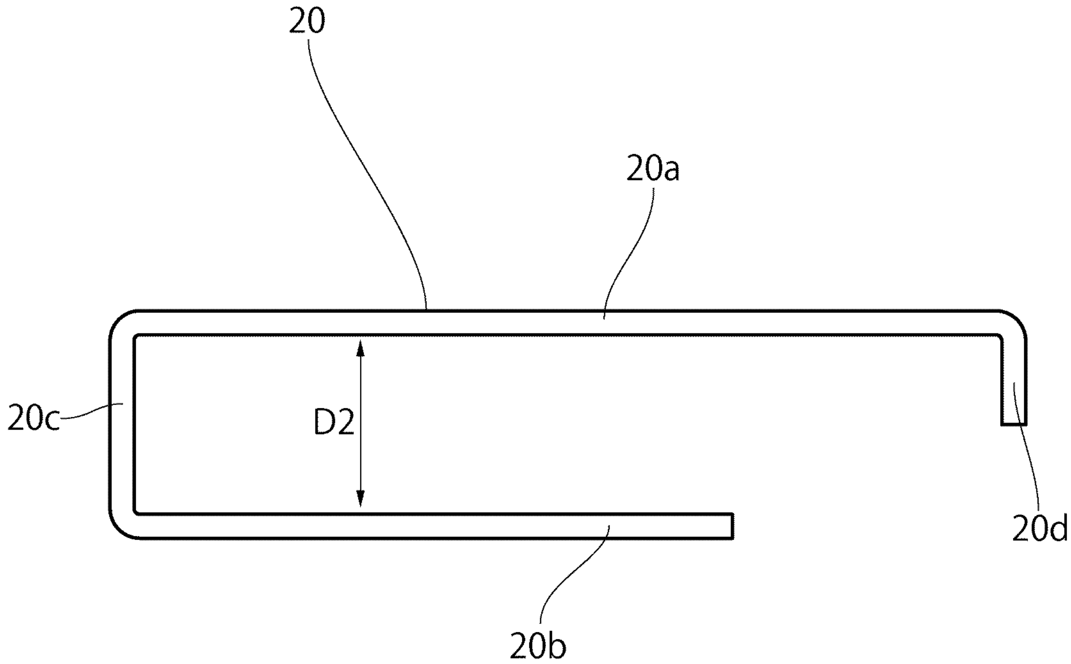
FIG. 7 is a side view of a lower securing member of the vibration isolation structure of FIG. 1 for holding an elastic vibration isolation member to a coupling member according to the principles of the present disclosure.
Figure 8:
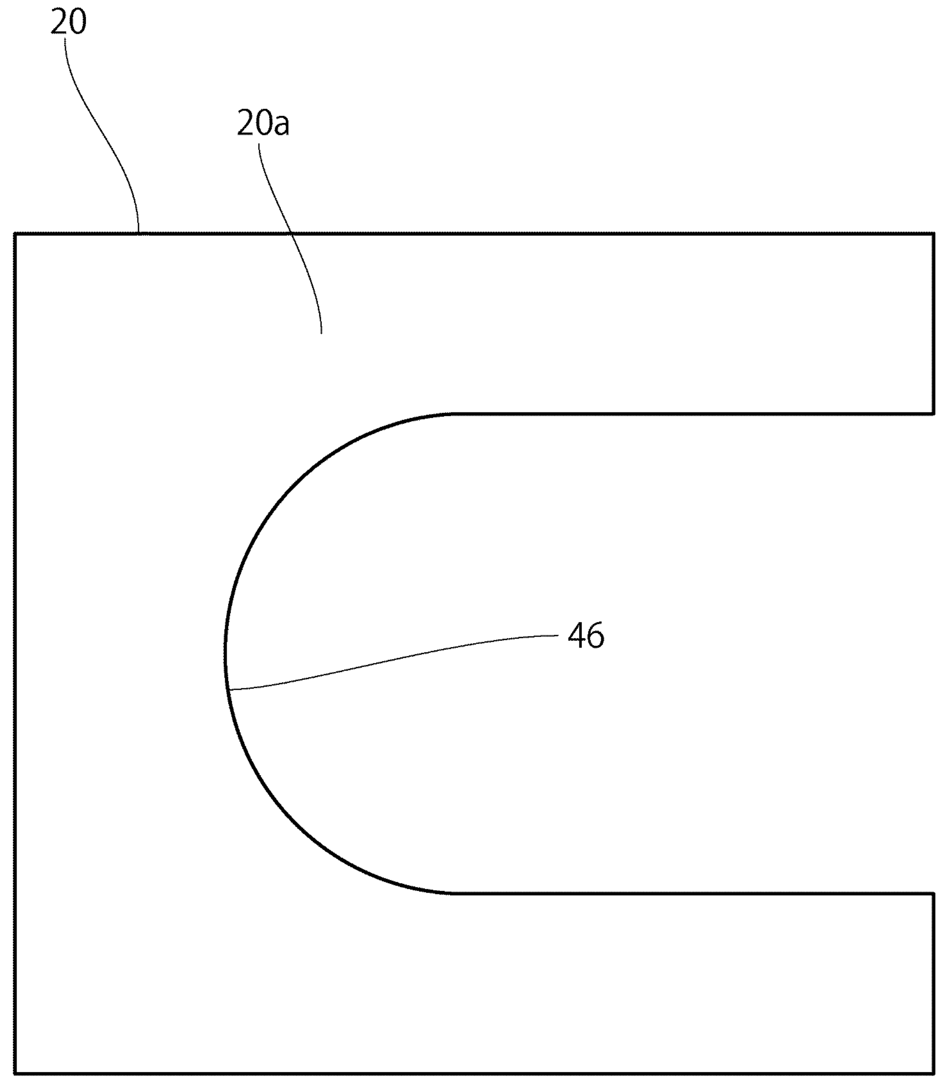
FIG. 8 is a top view of the lower securing member of FIG. 1.

With reference to FIGS. 7 and 8, the lower securing member 20 is a metal plate member formed by bending a single tabular member. The lower securing member 20 has first and second body portions or coupling body portions 20_a_ and 20_b_ (FIG. 7) extending to face each other at a distance D2, a connecting portion 20_c_ (FIG. 7) connecting together one end of the first body portion 20_a_ and one end of the second body portion 20_b_, and a locking projection or coupling locking projection 20_d_ (FIG. 7) extending from the first body portion 20_a_ toward the second body portion 20_b_. The first body portion 20_a_ and the second body portion 20_b_ have receiving holes 46 (FIG. 8) formed therein. The receiving holes 46 are sized to receive the lower narrow portion 40 of the elastic vibration isolation member 14.

Figure 9:
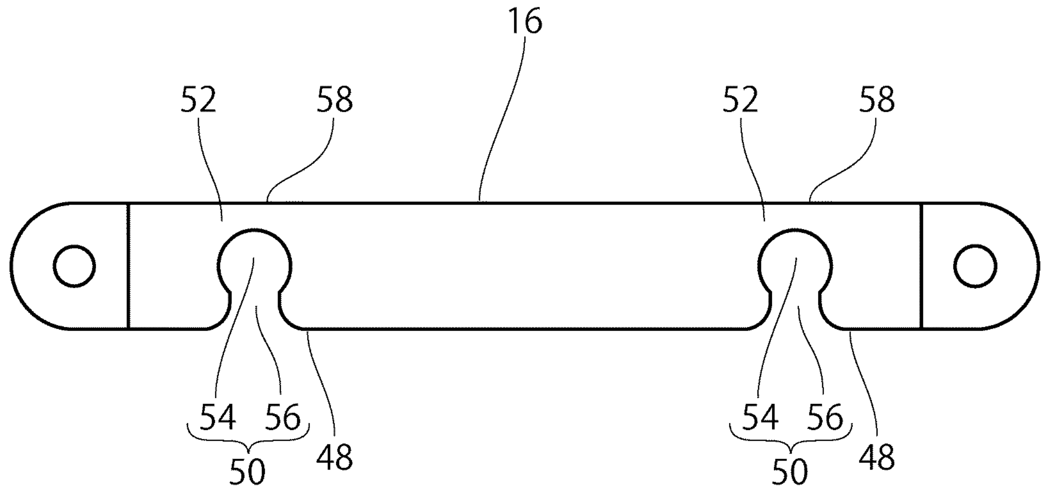
FIG. 9 is a top view of a coupling member of the vibration isolation structure of FIG. 1.

As shown in FIG. 9, the coupling member 16 is an elongated tabular member having a substantially uniform thickness as a whole. The coupling member 16 has two coupling insertion holes 50 extending therethrough in the thickness direction and extending to a first side surface 48 in the width direction (vertical direction as seen in FIG. 9). The coupling member 16 has coupling tabular mounting portions 52 formed in respective areas where the coupling insertion holes 50 are formed. Each coupling insertion hole 50 includes an arcuate portion 54 and a slightly narrow passage portion 56 extending from the arcuate portion 54 to the first side surface 48. Thus, the coupling insertion hole 50 has the same configuration as that of the insertion hole 28, which is formed in the above-described tabular mounting portion 22. It should be noted that although in this example, the coupling member 16 is a substantially uniform thickness member as a whole, portions of the coupling member 16 other than the coupling tabular mounting portions 52 may be thicker or thinner than the coupling tabular mounting portions 52.

Figure 10:
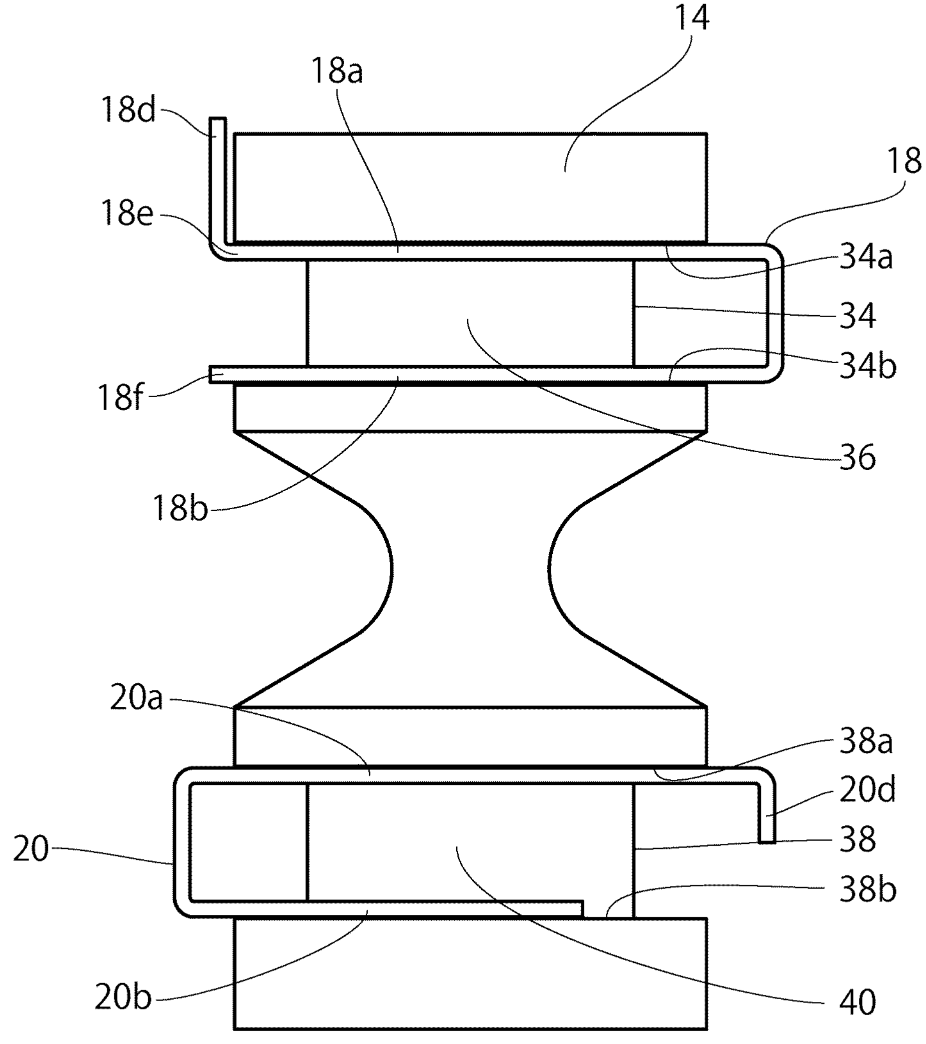
FIG. 10 is a side view of an elastic vibration isolation member with an upper securing member and a lower securing member attached thereto.

The elastic vibration isolation member 14 is installed as follows. First, as shown in FIG. 10, the upper securing member 18 is attached to the elastic vibration isolation member 14 in such a manner that the upper narrow portion 36 of the elastic vibration isolation member 14 is received into the receiving hole 44 of the upper securing member 18. Similarly, the lower securing member 20 is attached to the elastic vibration isolation member 14 in such a manner that the lower narrow portion 40 of the elastic vibration isolation member 14 is received into the receiving hole 46 of the lower securing member 20. The first and second body portions 18_a_ and 18_b_ of the upper securing member 18 are partially located in the upper mounting groove 34. The first body portion 18_a_ engages an upper surface 34_a_ of the upper mounting groove 34, and the second body portion 18_b_ engages a lower surface 34_b_ of the upper mounting groove 34. Similarly, the first and second body portions 20_a_ and 20_b_ of the lower securing member 20 are partially located in the lower mounting groove 38. The first body portion 20_a_ engages an upper surface 38_a_ of the lower mounting groove 38, and the second body portion 20_b_ engages a lower surface 38_b_ of the lower mounting groove 38.

Next, the upper narrow portion 36 of the elastic vibration isolation member 14 is inserted into the insertion hole 28 of the tabular mounting portion 22, and the elastic vibration isolation member 14 and the upper securing member 18 are attached to the mounting structure part 12 in such a manner that the tabular mounting portion 22 is inserted between the first and second body portions 18_a_ and 18_b_ of the upper securing member 18. Further, the lower narrow portion 40 of the elastic vibration isolation member 14 is inserted into the coupling insertion hole 50 of the coupling member 16, and the coupling member 16 is attached to the elastic vibration isolation member 14 and the lower securing member 20 in such a manner that the coupling member 16 is inserted between the first and second body portions 20_a_ and 20_b_ of the lower securing member 20.

Figure 11:
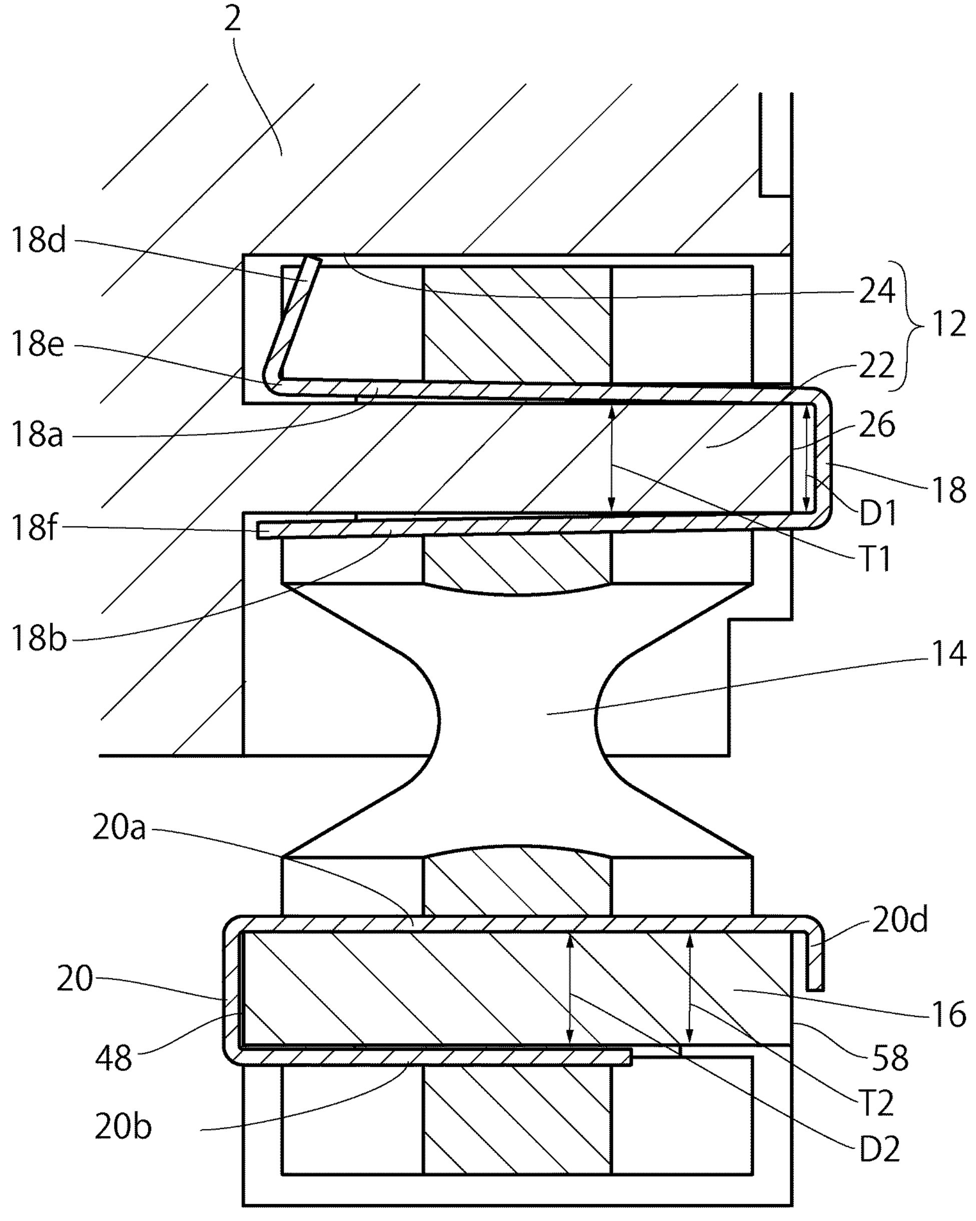
FIG. 11 is a cross-sectional view of the pump device taken along the line A-A of FIG. 2.

In the installed state shown in FIG. 11, the first and second body portions 18_a_ and 18_b_ of the upper securing member 18 are opposed to each other across the tabular mounting portion 22 in the thickness direction thereof. It should be noted that the upper securing member 18 is formed so that the distance D1 between the first and second body portions 18_a_ and 18_b_ when the upper securing member 18 is not attached to the mounting structure part 12 is smaller than the thickness T1 of the tabular mounting portion 22. Accordingly, as the tabular mounting portion 22 is inserted between the first and second body portions 18_a_ and 18_b_, the first and second body portions 18_a_ and 18_b_ respectively receive forces in directions away from each other, causing the upper securing member 18 to be deformed such that the other end 18_e_ of the first body portion 18_a_ and the other end 18_f_ of the second body portion 18_b_ come away from each other. Consequently, the locking projection 18_d_ extending upward from the other end 18_e_ of the first body portion 18_a_ is gradually firmly pressed against the locking surface 24. In this example, the locking projection 18_d_ is slightly obliquely bent toward the connecting portion 18_c_. The upper securing member 18 is formed of a metal, and the locking surface 24 is formed of a resin. Therefore, when firmly pressed against the locking surface 24, the locking projection 18_d_ of the upper securing member 18 slightly cuts into the locking surface 24. With the locking projection 18_d_ engaging the locking surface 24 in this way, the upper securing member 18 is secured to the mounting structure part 12. The upper securing member 18 has the first and second body portions 18_a_ and 18_b_ engaged with the elastic vibration isolation member 14 at a side of the tabular mounting portion 22 closer to the side surface 26, thereby holding the elastic vibration isolation member 14 to the tabular mounting portion 22.

In this installed state, the first and second body portions 20_a_ and 20_b_ of the lower securing member 20 are opposed to each other across the coupling member 16 in the thickness direction thereof. Here, the distance D2 between the first and second body portions 20_a_ and 20_b_ of the lower securing member 20 is substantially the same as or slightly greater than the thickness T2 of the coupling member 16. In the installed state shown in the figure, the locking projection 20_d_ is located to face a second side surface 58 of the coupling member 16. The lower securing member 20 is inhibited from being detached from the coupling member 16 by engagement of the locking projection 20_d_ with the second side surface 58. Further, the first and second body portions 20_a_ and 20_b_ are engaged with the elastic vibration isolation member 14 from a side closer to the first side surface 48. This permits the lower securing member 20 to inhibit the elastic vibration isolation member 14 from being displaced toward the passage portion 56 of the coupling insertion hole 50, and thus holding the elastic vibration isolation member 14 to the coupling member 16.

With the vibration isolation structure 10 of the present disclosure, the use of the upper securing member 18 permits the elastic vibration isolation member 14 to be held to the mounting structure part 12 and makes it possible to inhibit the elastic vibration isolation member 14 from being detached from the tabular mounting portion 22 without using adhesive. Further, installation is completed simply by pushing the upper securing member 18 into the mounting structure part 12, together with the elastic vibration isolation member 14 having the upper securing member 18 attached thereto. Accordingly, the assembling operation does not become complicated. Similarly, the use of the lower securing member 20 permits the elastic vibration isolation member 14 to be firmly secured to the coupling member 16 without using adhesive. Further, installation is completed simply by pushing the coupling member 16 into the lower securing member 20, with the lower securing member 20 attached to the elastic vibration isolation member 14. Accordingly, the assembling operation does not become complicated.

Although one example of the vibration isolation structure 10 of the present disclosure has been described above, the present disclosure is not limited to the described example. For example, the mounting structure part need not be integrally formed with a pump or other device but may be configured to be attached to such a device afterward. The upper securing member and the lower securing member need not be metal plate members but may be made by other methods. For example, the upper and lower securing members may be resin molded articles. Further, the lower securing member and the coupling member are not always desired. The elastic vibration isolation members may be configured to support the pump independently of each other. The vibration isolation structure of the above-described embodiment is constructed to support a pump accompanied by vibration to a place of installation but may also be constructed to support another device or equipment on a device accompanied by vibration, for example. The numbers of mounting structure parts and/or elastic vibration isolation members may be changed as desired according to applications. Further, devices to which the vibration isolation structure according to the present disclosure is applicable are not limited to pumps. The present disclosure is applicable to various devices accompanied by vibration, e.g., compressors, power generators, and machineries such as drills.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vibration isolation structure for a device accompanied by vibration, the vibration isolation structure comprising:

at least one mounting structure part configured to be secured to the device and having a tabular mounting portion and a locking surface facing the tabular mounting portion, the tabular mounting portion having an insertion hole extending therethrough in a thickness direction of the tabular mounting portion and extending in a longitudinal direction of the tabular mounting portion to a side surface of the tabular mounting portion;

at least one elastic vibration isolation member having a narrow portion narrowed by a mounting groove formed therein, the at least one elastic vibration isolation member being attached to the tabular mounting portion in such a manner that the narrow portion is inserted into the insertion hole in the longitudinal direction so that the tabular mounting portion is partially located in the mounting groove; and at least one securing member secured to the at least one mounting structure part to hold the at least one elastic vibration isolation member to the tabular mounting portion, the at least one securing member having a first body portion and a second body portion opposed to each other across the tabular mounting portion in the thickness direction, a connecting portion connecting together a first end of the first body portion and second end of the second body portion, and a locking projection projecting from the first body portion away from the tabular mounting portion, the at least one securing member being secured to the at least one mounting structure part by engagement of the locking projection with the locking surface, and the at least one securing member holding the at least one elastic vibration isolation member to the tabular mounting portion by engaging the at least one elastic vibration isolation member at least from a side thereof closer to the side surface.

2. The vibration isolation structure of claim 1, wherein the at least one securing member is configured such that a distance between the first body portion and the second body portion when the at least one securing member is not attached to the mounting structure part is smaller than a thickness of the tabular mounting portion, so that as the tabular mounting portion is inserted between the first body portion and the second body portion, the at least one securing member is deformed such that a third end of the first body portion and a fourth end of the second body portion come away from each other.

3. The vibration isolation structure of claim 2, wherein the locking projection is provided on the third end of the first body portion.

4. The vibration isolation structure of claim 3, wherein the at least one securing member is a metal plate member formed by bending a single tabular member.

5. The vibration isolation structure of claim 1, wherein each of the first body portion and the second body portion has a receiving hole to receive the narrow portion of the at least one elastic vibration isolation member, the first body portion and the second body portion partially located in the mounting groove of the at least one elastic vibration isolation member, at least one of the first body portion and the second body portion being engaged with the at least one elastic vibration isolation member, thereby holding the at least one elastic vibration isolation member to the tabular mounting portion.

6. The vibration isolation structure of claim 1, wherein the at least one securing member is attached to the tabular mounting portion from a side closer to the side surface.

7. The vibration isolation structure of claim 1, wherein the at least one mounting structure part includes a plurality of the mounting structure parts, the at least one elastic vibration isolation member includes a plurality of elastic vibration isolation members, and the at least one securing member includes a plurality of securing members, the plurality of elastic vibration isolation members and the plurality of securing members attached to the plurality of mounting structure parts, each elastic vibration isolation member being a columnar member extending from one end to an other end, the narrow portion being provided at a side of the elastic vibration isolation member closer to the one end, each elastic vibration isolation member further having a coupling narrow portion at a side thereof closer to the other end, the coupling narrow portion having a coupling mounting groove formed therein;

the vibration isolation structure further comprising:

a coupling member coupling together the plurality of elastic vibration isolation members at the coupling narrow portions; and a plurality of coupling securing members secured to the coupling member to hold the elastic vibration isolation members to the coupling member.

8. The vibration isolation structure of claim 7, wherein the coupling member has a plurality of coupling tabular mounting portions, each coupling tabular mounting portion of the plurality of coupling tabular mounting portions having a coupling insertion hole extending therethrough in a thickness direction of the coupling insertion hole and extending in a width direction of the coupling insertion hole to a first side surface of the coupling insertion hole; and each coupling securing member of the plurality of coupling securing members having a first coupling body portion and a second coupling body portion opposed to each other across the coupling tabular mounting portion in the thickness direction, a connecting portion connecting together one end of the first coupling body portion and one end of the second coupling body portion, and a coupling locking projection projecting from an other end of the first coupling body portion toward the second coupling body portion, the coupling securing member being attached to the coupling tabular mounting portion from a side closer to the first side surface so that the coupling locking projection engages a second side surface of the coupling tabular mounting portion opposite the first side surface, thereby inhibiting the coupling securing member from being detached from the coupling tabular mounting portion, and the coupling securing member holding the elastic vibration isolation member to the coupling tabular mounting portion by engaging the elastic vibration isolation member at least from a side closer to the first side surface.

* * * * *